(12) United States Patent
Mistry (10) Patent No.: US 11,496,430 B2
(45) Date of Patent: Nov. 8, 2022

(54) CONFIGURABLE OFFLINE MESSAGING MANAGEMENT USING USER PRESENCE INFORMATION

(71) Applicant: Citrix Systems, Inc., Fort Lauderdale, FL (US)

(72) Inventor: Shaunak Mistry, Scotts Valley, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1106 days.

(21) Appl. No.: 14/684,778

(22) Filed: Apr. 13, 2015

(65) Prior Publication Data

US 2016/0301648 A1    Oct. 13, 2016

(51) Int. Cl.
| | |
|---|---|
| *G06F 15/16* | (2006.01) |
| *H04L 51/224* | (2022.01) |
| *H04L 51/043* | (2022.01) |
| *H04L 67/54* | (2022.01) |
| *H04L 51/214* | (2022.01) |

(52) U.S. Cl.
CPC .......... *H04L 51/224* (2022.05); *H04L 51/043* (2013.01); *H04L 67/54* (2022.05); *H04L 51/214* (2022.05)

(58) Field of Classification Search
CPC ....... H04L 51/24; H04L 51/043; H04L 51/14; H04L 67/24
USPC .................................................. 709/207, 206
See application file for complete search history.

(56) References Cited

U.S. PATENT DOCUMENTS

| | | | | |
|---|---|---|---|---|
| 6,871,217 B2* | 3/2005 | Voticky | ................ | G06Q 10/107 709/207 |
| 7,730,143 B1* | 6/2010 | Appelman | .............. | H04W 4/12 709/206 |
| 8,719,371 B1* | 5/2014 | Nerieri | .................... | H04L 51/06 709/217 |
| 2003/0023691 A1* | 1/2003 | Knauerhase | ............ | H04L 51/04 709/206 |
| 2008/0086535 A1* | 4/2008 | Arhant-Wibaux | .... | G06F 16/951 709/207 |

(Continued)

FOREIGN PATENT DOCUMENTS

| | | |
|---|---|---|
| EP | 2249517 A1 | 11/2010 |
| WO | 2008102265 A2 | 8/2008 |

(Continued)

*Primary Examiner* — Yves Dalencourt
(74) *Attorney, Agent, or Firm* — Banner & Witcoff, Ltd.

(57) ABSTRACT

Methods, systems, computer-readable media, and apparatuses may provide management of messaging for one or more devices of a user according to the user's configurable presence schedule. A messaging management server may receive notifications of messages and the messages themselves from a messaging service provider. The messages may have originated from a first user and be intended for receipt by a second user. After a preset time period has elapsed, a notification of the message may be sent from the messaging management server to each of the second user's devices in accordance with the second user's presence schedule. Subsequent messages from the first user and intended for the second user may be routed from the messaging management server to the device on which the second user responded to the notification of the initial message and might not be routed to the second user's other devices.

16 Claims, 7 Drawing Sheets

(56) References Cited

U.S. PATENT DOCUMENTS

| | | | |
|---|---|---|---|
| 2012/0173610 A1* | 7/2012 | Bleau | H04L 67/26 709/203 |
| 2012/0239799 A1* | 9/2012 | Wang | H04L 41/145 709/224 |
| 2014/0235282 A1 | 8/2014 | Kansal et al. | |
| 2015/0134753 A1* | 5/2015 | Shin | H04L 51/14 709/206 |

FOREIGN PATENT DOCUMENTS

| | | | | |
|---|---|---|---|---|
| WO | WO-2008102265 A2 * | 8/2008 | | H04L 67/24 |
| WO | 2014194405 A1 | 12/2014 | | |

* cited by examiner

Second User's Presence Schedule

Second User's First Mobile Device 302a

|  | Active/Online State | Inactive/Offline State |
|---|---|---|
| Mondays | 8:00am – 5:00pm | Otherwise |
| Tuesdays | 8:30am – 4:00pm | Otherwise |
| Wednesdays | 9:00am – 10:00am<br>1:00pm – 2:00pm | Otherwise |
| Thursdays | 8:00am – 5:00pm | Otherwise |
| Fridays | None | All Day |
| Saturdays | None | All Day |
| Sundays | None | All Day |

Second User's Second Mobile Device 302b

|  | Active/Online State | Inactive/Offline State |
|---|---|---|
| Monday | 8:30am – 5:00pm | Otherwise |
| Tuesday | 8:00am – 5:00pm | Otherwise |
| Wednesday | 9:00am – 10:00am<br>1:00pm – 2:00pm | Otherwise |
| Thursday | 8:00am – 5:00pm | Otherwise |
| Friday | 8:00am – 5:00pm | Otherwise |
| Saturday | None | All Day |
| Sunday | None | All Day |

CONFIGURABLE OFFLINE MESSAGING MANAGEMENT USING USER PRESENCE INFORMATION

FIELD

Aspects of the disclosure relate to computer hardware and software. In particular, one or more aspects of the disclosure generally relate to computer hardware and software for managing offline messaging using user presence information.

BACKGROUND

Many organizations utilize instant messaging clients to enable its members and/or employees to communicate with one another. Some of these instant messaging clients may be linked with other services (e.g., email services, document processing services, etc.) provided by the instant messaging service provider. Instant messaging services rely on presence information of an intended recipient's device to determine whether to send an instant message to the recipient's device. Specifically, instant messaging services do not send instant messages to an intended recipient's device when the presence information indicates that the recipient or the recipient's device is offline and/or otherwise inactive. As a result, when the recipient is offline, the recipient cannot receive messages from another user. Further, because the instant messaging service will transmit messages to the intended recipient's device when the presence information indicates that the recipient or the recipient's device is online and/or otherwise active, the recipient may receive messages at times when the recipient might not want to receive such messages such as late at night.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

There is a persistent need to enable an intended recipient of a message to control and/or otherwise configure when messages should and should not be transmitted to the intended recipient's device.

Systems and methods are described herein for managing messaging for one or more devices of a user according to the user's configurable presence schedule. As an example, a messaging management server may receive notifications of messages and the messages themselves from a messaging service provider. The messages may have originated from a first user and be intended for receipt by a second user via one of his or her computing devices. If the message is a first or initial message from the first user and after a preset time period has elapsed, a notification of the message may be sent from the messaging management server to each of the second user's devices in accordance with the second user's presence schedule. For instance, the notification may be sent to each device on which the second user is scheduled to be active and in which the device is in an online (e.g., "on") state. However, the notification might not be sent to devices on which the second user is scheduled to be inactive and/or devices that are in an offline (e.g., "off") state but may store and subsequently send the notification once the second user is scheduled to be active on the device and the device is in an online (e.g., "on") state. Subsequent messages from the first user and intended for receipt by the second user may be routed from the messaging management server to the device on which the second user responded to the notification of the initial message and might not be routed to the second user's other devices. If the second user has stopped responding for at least a configurable time period, a notification of a new message received that originated from the first user may be sent to each of the second user's device in accordance with the presence schedule.

In some embodiments, an apparatus may include a process and a computer readable medium storing instructions that, when executed by the processor, cause the apparatus to perform a number of steps. The apparatus may receive, from a message service provider, a notification of an initial message originating from a first user and intended for receipt by a second user. After a configurable preset duration has elapsed since receiving the notification, the apparatus may determine a first set of user devices, of multiple user devices associated with the second user, on which the second user is currently scheduled to be in an active presence state based on a presence schedule of the second user. The apparatus may send the notification of the initial message to the first set of user devices.

In some embodiments, an apparatus may include a processor and a computer readable medium storing instructions that, when executed by the processor, cause the apparatus to perform a number of steps. The apparatus may determine a first time at which a response to a first message originating from a first user and intended for receipt by a second user was received from a first user device of multiple user devices of the second user. The apparatus may determine a second time at which a second message originating from the first user and intended for receipt by the second user was received. The apparatus may determine a duration based on the first time and the second time and determine whether the determined duration is greater than a maximum duration. In response to determining that the determined duration is greater than the maximum duration, send a notification of the second message to each of the second user's multiple devices in accordance with a presence schedule of the second user.

In some embodiments, an apparatus may include a processor and a computer readable medium storing instructions that, when executed by the processor, cause the apparatus to perform a number of steps. The apparatus may receive a notification of a first message originated from a first user and intended for receipt by a second user. After waiting a preset duration, the apparatus may send the notification of the first message to one or more devices of the second user in accordance with a presence schedule of the second user. The apparatus may receive a response from a first user device of the one or more user devices of the second user. The apparatus may receive a second message originating from the first user and intended for receipt by the second user. In response to determining that a duration defined by a time at which the response was received and a time at which the second message was received is less than or equal to a maximum duration, the apparatus may send the second message to the first user device in accordance with the presence schedule of the second user.

These features, along with many others, are discussed in greater detail below.

BRIEF DESCRIPTION OF THE DRAWINGS

The present disclosure is illustrated by way of example and not limited in the accompanying drawings in which like reference numerals indicate similar elements and in which.

DETAILED DESCRIPTION

In the following description of the various embodiments, reference is made to the accompanying drawings, which form a part hereof, and in which is shown by way of illustration various embodiments in which a messaging management solution may be practiced. It is to be understood that other embodiments may be utilized and structural and functional modifications may be made without departing from the scope of aspects discussed herein. The messaging management system is capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
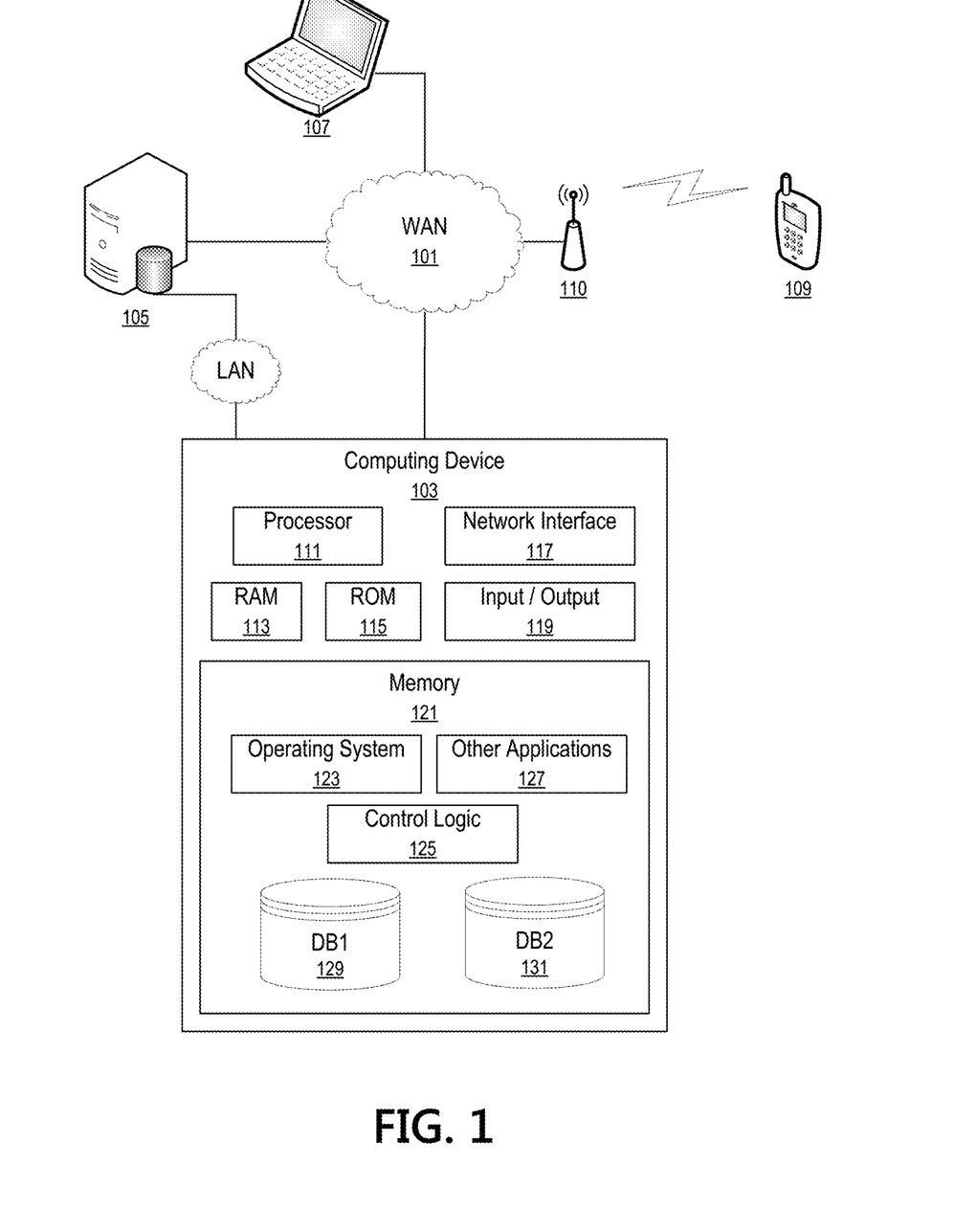
FIG. 1 depicts an illustrative network architecture and data processing device that may be used to implement one or more illustrative aspects described herein.

FIG. 1 illustrates one example of a network architecture and data processing device that may be used to implement one or more illustrative aspects described herein. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media. One or more devices (e.g., device 109) may be connected using a cellular connection with base station 110 that is communicatively coupled to WAN 101 to communicate with the other devices.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device and may have the same components as data server 103. Data server 103, e.g., may include a processor 111 controlling overall operation of the data server 103. Data server 103 may further include RAM 113, ROM 115, network interface 117, input/output interfaces 119 (e.g., keyboard, mouse, touchscreen display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects as described herein, and other application software 127 providing secondary, support, and/or other functionality which may or may not be used in conjunction with aspects discussed herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects of the messaging management system may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein.

The messaging management system may be implemented using the network architecture described in FIG. 1. For example, the messaging management system may be implemented via one or more of the data server 103, the web server 105, and/or the client computers 107, 109.

Figure 2:
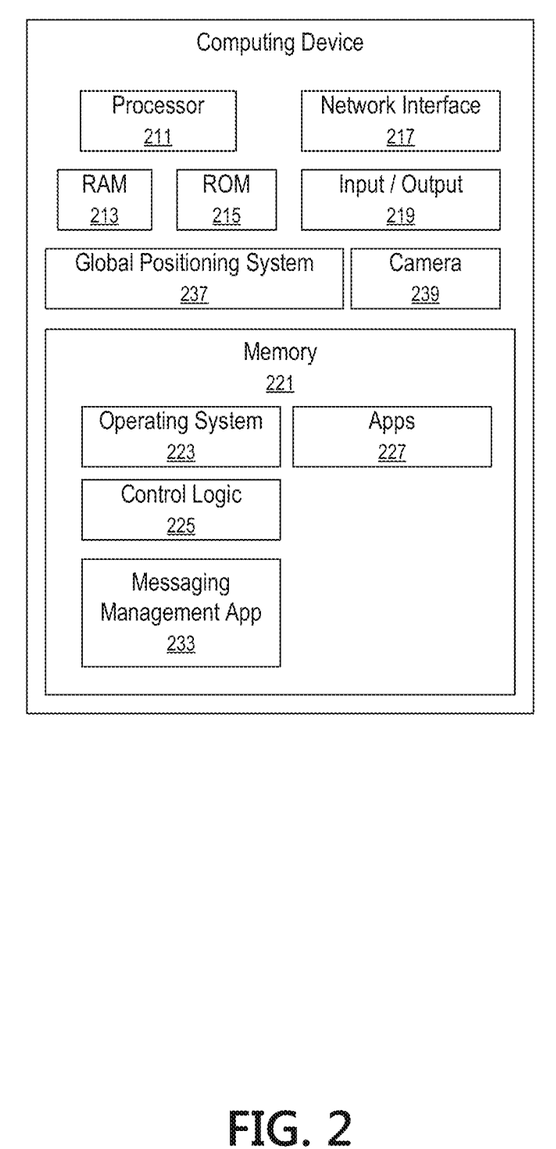
FIG. 2 depicts an illustrative computing device that may be used to implement one or more illustrative aspects described herein.

FIG. 2 depicts an illustrative computing device that may be used to implement one or more illustrative aspects described herein. For example, any computing device discussed herein may include a processor 211, RAM 213, ROM 215, network interface 217, input and output interfaces 219 (e.g., a touchscreen display, stylus, physical buttons, audio input, audio output, etc.), memory 221, mobile operating system 223 (e.g., iOS, android, windows, Linux, etc.), and control logic 225 that may each be configured as discussed above in FIG. 1. Additionally, memory 121 may store one or more applications 227 (e.g., software applications, mobile applications, etc.). The computing device may also include a global position system (GPS) sensor 237 configured to determine the geographic location (e.g., latitudinal and longitudinal coordinates) of the computing device. Computing device may include an optical sensor such as camera 239 that may generate photographs of physical objects.

Figure 3:
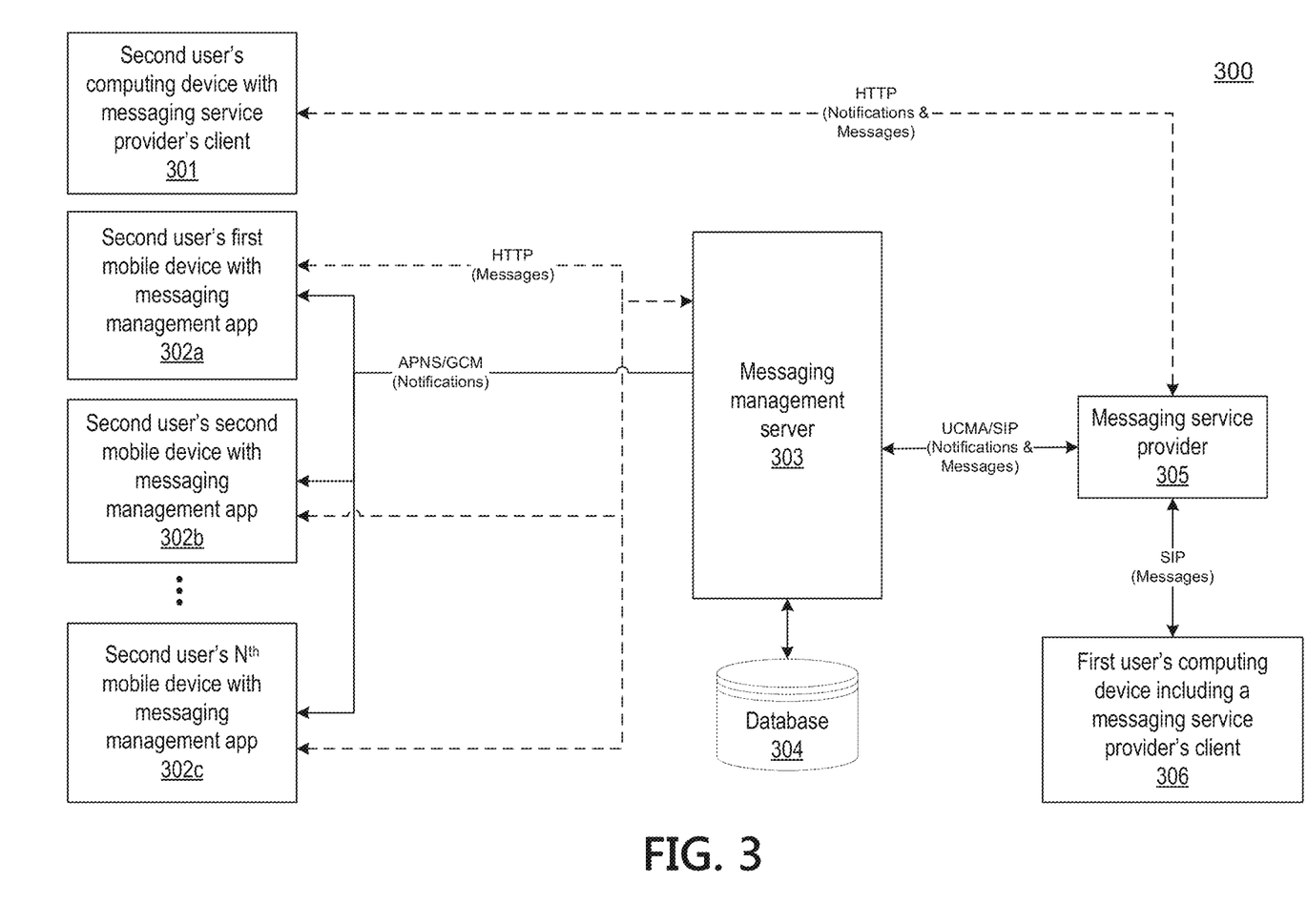
FIG. 3 depicts an illustrative system that may be used to implement one or more illustrative aspects described herein.

FIG. 3 depicts an illustrative system that may be used to implement one or more illustrative aspects described herein. The system 300 may include a first user's computing device 306, a second user's computing device 301, the second user's mobile devices 302a-c, a messaging management server 303, a database 304, and a messaging service provider 305.

Messaging service provider 305 may be responsible for providing instant messaging services to a variety of users for an organization or other entity. In one example, messaging service provider 305 may be Microsoft Lync or Microsoft Office Communicator. In another example, messaging service provider 305 may be another instant messaging service provider. The messaging service provider 305 may be configured to relay messages between a variety of different computing devices of different users such as, for example, personal computers, laptop computers, tablet computers, smartphones, and the like. As an example, messaging service provider 305 may receive a message from its client application installed on the first user's computing device 306 (e.g., a personal computer, laptop computer, tablet computer, smartphone, etc.) and route that message to its client application installed on a computing device of the intended recipient of the message, and vice versa. Messaging service provider 305 and the first user's computing device 306 may communicate with one another using e.g., session initiation protocol (SIP) or another protocol. For example, the first user's computing device 306 may transmit to and receive messages from messaging service provider 305.

In response to receiving a message from the first user's computing device 306, the messaging service provider 305 may be configured to determine which of the intended recipient's devices to send the message based on presence information of the intended recipient (and/or the presence state of the intended recipient's device). In one or more arrangements, the messaging service provider 305 may send and/or otherwise transmit a message to an intended recipient's device in response to determining that the intended recipient is online or has an active presence on that device. As an example, if the intended recipient (also referred to herein as a second user) is currently using (or has recently used within a preset time period) his or her computing device 301 (e.g., personal computer or laptop computer), then an application installed on that device 301 may indicate to the message service provider 305 that the second user is present or active on the device 301 and send the message to that second's user computing device 301. In some embodiments, the messaging service provider may send a notification of the message rather than the message itself for the second user's computing device to subsequently request and receive the message from the messaging service provider 305. Second user's computing device 301 and messaging service provider 305 may communicate with one another using e.g., a hypertext transfer protocol (HTTP) or another protocol. Other presence states of the user which may be considered an active or online presence state may include "away for five minutes" presence state, an "in a meeting" presence state, or the like. If the second user is in an offline or inactive presence state, the messaging service provider 305 might not send the message (or its notification) to the second user device 301. As an example, if an application on a particular device indicates that the presence state of the user is inactive, away for an hour, at home, on vacation, and/or otherwise offline, etc., the messaging service provider 305 might not send either a notification of the message or the message itself to that device.

Figure 5:
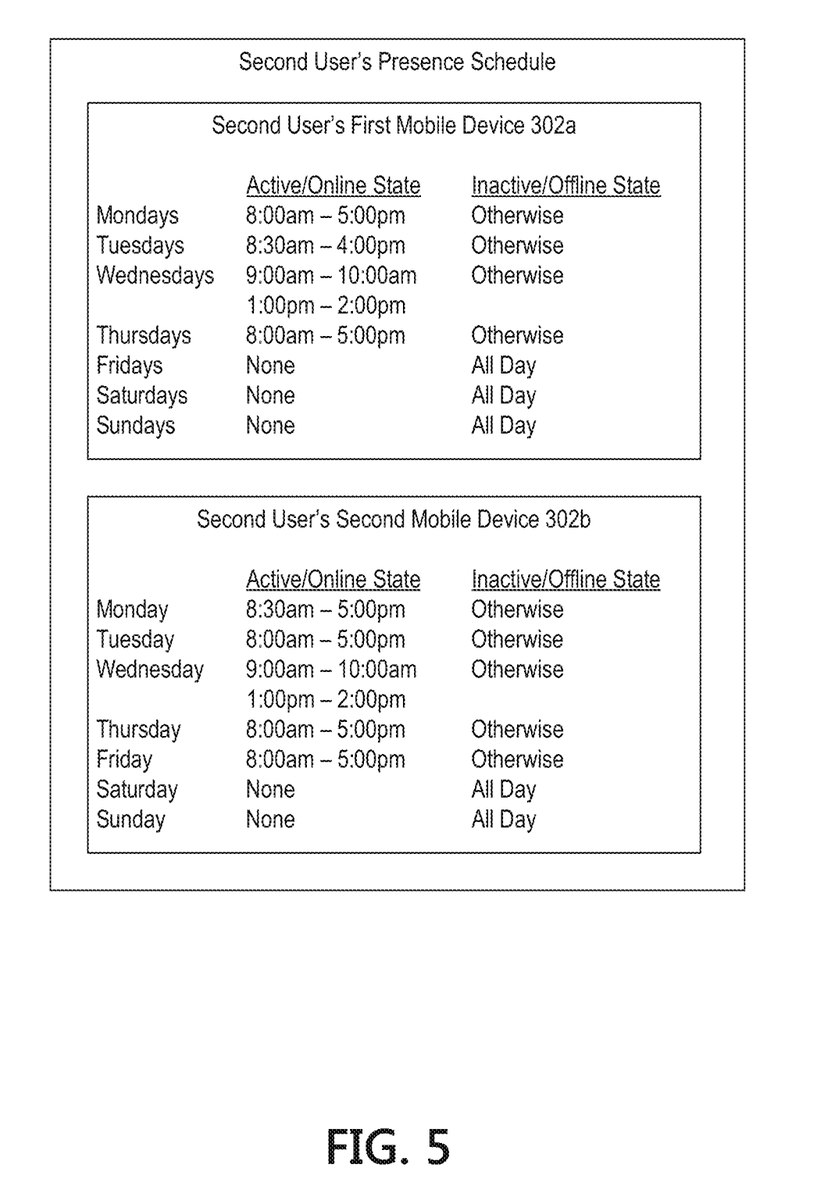
FIG. 5 depicts an illustrative presence schedule that may be used to implement one or more illustrative aspects described herein.

The messaging management server 303 may be responsible for managing communications between messaging service provider 305 and one or more of the second user's mobile devices 302a-c (e.g., tablets computers, smartphones, or the like), which may have installed therein a messaging management app associated with messaging management server 303. Messaging management server 303 and messaging service provider 305 may communicate with one another using e.g., unified communications managed application program interface (UCMA) or another application program interface (API). Further, messaging management server 303 and messaging service provider 305 may communicate with one another using e.g., SIP or another protocol. Messaging management server 303 may receive a presence schedule of the second user. The presence schedule may include, for one or more of the second user's mobile devices 302a-c, time periods during which the user is scheduled to be in an active or online presence state on one or more devices, and time periods when the user is scheduled to be in an inactive or offline presence state on one or more devices. An example of a presence schedule is shown in FIG. 5, which is described in further detail below. Messaging management server 303 may receive the presence schedule or an update to the presence schedule from the second user via one of his or her devices 301, 302a-c or via a system administrator (not shown). In some embodiments, messaging management server 303 may inform messaging service provider 305 of the second user's presence state for one or more devices. If messaging management server 303 indicates to the messaging service provider 305 that the user is active on at least one of the user's mobile devices 302a-c, messaging management server 303 may receive messages and/or notifications of messages from messaging service provider 305 and forward or relay the notifications and messages to one or more of the second user's mobile devices 302a-c. Further, messaging management server 303 may store notifications, messages, presence state information, and other information discussed herein in database 304 for subsequent retrieval. In some embodiments, messaging management server 303 may always indicate to messaging service provider 305 that the second user is in active or online presence state on at least one of his or her mobile devices 302a-c so that it may receive a notification of the message or the message itself even when the user is presently scheduled to be offline or inactive so that it can store and later forward the notification or message to one of the second user's mobile devices 302a-c when the second user's presence schedule indicates that the user is schedule to be online or active on that device.

Messaging management server 303 may communicate with the second user's mobile devices 302a-c using a variety of different protocols. As an example, the messaging management server 303 may transmit notifications using e.g., apple push notification service (APNS), google cloud messaging (GCM), or another notification mechanism that transmits a notification of a message to a messaging management app (associated with the messaging management server 303) installed on the second user' mobile devices 302a-c. The app may then notify the second user of the message notification. Further, messaging management server 303 and the second user's mobile devices 302a-c may transmit messages to one another using e.g., HTTP or another protocol. Additionally, messaging management server 303 may forward or relay messages from the second user's mobile devices 302a-c to messaging service provider 305 to forward or relay the message to the first user's computing device 306.

Messaging management server 303 may periodically send requests for device state information to the second user's mobile devices 302a-c and, in response, may receive an indication that a device is in an on state from one or more of the second user's mobile devices 302a-c. If messaging management server 303 does not receive a response a particular device, messaging management server 303 may assume that the device is currently in an off state.

In one or more arrangements, messaging management server 303, database 304, and messaging service provider 305 may be within the same trust zone and/or otherwise controlled by the same administrative authority and/or the same trust certificate so that communication between messaging management server 303, database 304, and messaging service provider 305 may be assumed to be secure between one another. As a result, communications between these devices 303, 304, 305 may be performed without having to perform additional security authentications. However, once a communication crosses a boundary of the trust zone, which occurs when communications are sent to or received from the first and second user's devices, additional security measure may be performed. As an example, communications between messaging management server 303 and the second user's mobile devices 302a-c may be performed using secure socket layer (SSL) or other security mechanisms.

Figure 4:
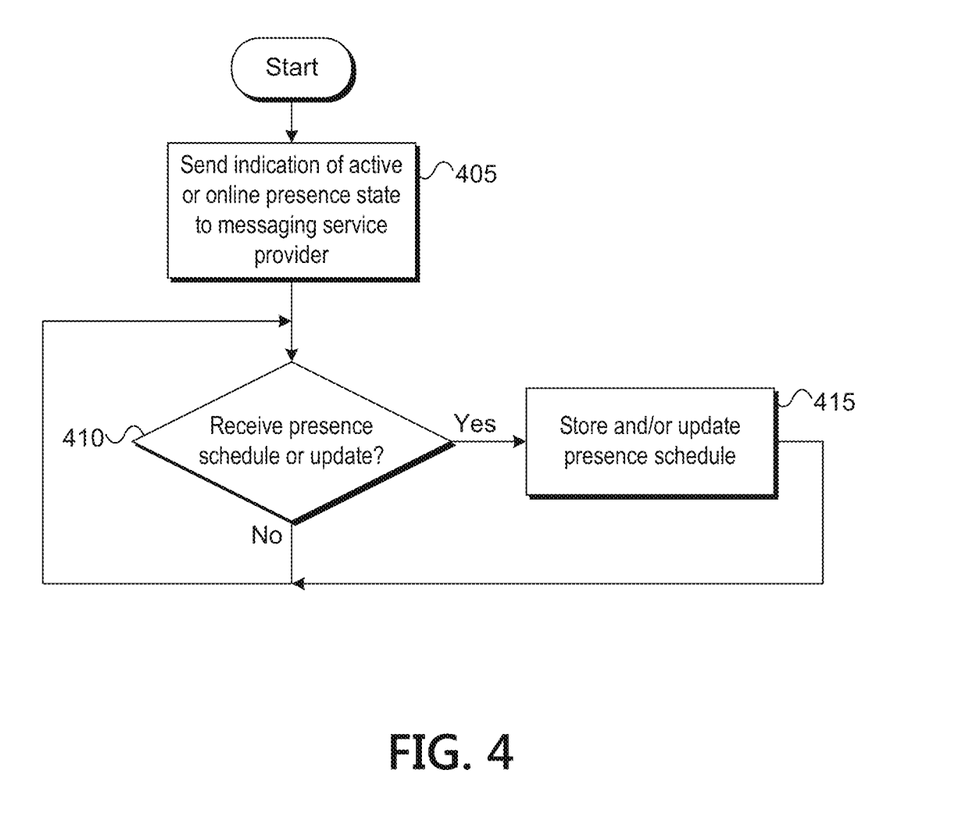
FIG. 4 depicts an illustrative method to update presence information for use by a messaging management server that may be used to implement one or more illustrative aspects discussed herein.

FIG. 4 depicts an illustrative method to manage a user's presence schedule that may be used to implement one or more illustrative aspects discussed herein. In one or more embodiments, the method of FIG. 4 and/or one or more steps thereof may be performed by a computing device (e.g., messaging management server 303). In other embodiments, the method illustrated in FIG. 4 and/or one or more steps thereof may be embodied in computer-executable instructions that are stored in a computer-readable medium, such as a non-transitory computer-readable memory. In some instances, one or more of the steps of FIG. 4 may be performed in a different order. In some instances, one or more of the steps of FIG. 4 may be omitted and/or otherwise not performed.

As seen in FIG. 4, the method may begin at step 405 in which a computing device (e.g., messaging management server 303) may send, to the message service provider 305, an indication of a user's presence information such as an indication that the use is currently using a particular device or a particular application on a device (e.g., an online or active presence state of the user) for one or more of the user's device (e.g., second user's mobile devices 302a-c). Additionally, in some instances, messaging management server 303 may send, to the messaging service provider 305, an identifier of message management server 303 and instructions to route notifications and messages to messaging management server. In other instances, messaging management server 303 may impersonate one or more of the second user's devices 302a-c so that messaging service provider 305 believes that messaging management server 303 is one or more of the second user's devices 302a-c. As a result, messaging service provider 305 may send notifications and messages intended for receipt by the second user to messaging management server 303.

By sending the indication of the user's active or online presence state to message service provider 305, messaging service provider 305 may send notifications of messages and/or the messages themselves to messaging management server 303 (since the messaging service provider 305 may be configured to not send the notification of the message and/or the message itself if the user is inactive with respect to a particular user device or particular application on the device). As a result, messaging management server 303 may serve as a proxy for the second user's mobile devices 302a-c and may store the notifications and messages on behalf of the second user (when the user is scheduled to be inactive on a device and/or the device is in off state) and forward to one or more of the second user's mobile devices 302a-c when the presence schedule presently indicates that the user is scheduled to be active on that particular device and the device is in an on state.

Messaging management server 303 may send the indication that user is active or present on one of the mobile devices 302a-c even if the user is actually inactive or offline on each (e.g., all) of the second user's mobile devices 302a-c. This enables messaging management server 304 to obtain notifications and messages from messaging service provider 305 that originated from the first user even if the user is not currently using a device or the device is in an off state. Messaging management server 304 may store the notifications and/or messages but might not send the notification or message to one or more of the second user's mobile devices until that the presence schedule indicates that the second user is currently active or online on that mobile device, which will be discussed in further detail below.

In step 410, messaging management server 303 may determine whether a presence schedule or update to a presence schedule has been received from a user's device (e.g., a user's first mobile devices 302a) and/or system administrator and, if so, may store the store the presence schedule and/or update a previously stored presence schedule in database 304 in step 415. FIG. 5 depicts an illustrative presence schedule that may be used to implement one or more illustrative aspects described herein. The second user's presence schedule may be configurable by the user and/or another entity (e.g., an administrator in a bring-your-own-device (BYOD) environment) and include a presence schedule for one or more of the second user's mobile devices 302a-c. As an example, the presence schedule for the second user's first mobile device 302a may specify one or more time periods during which the second user is scheduled to have a presence state of active or online for the first mobile device 302a (e.g., that the second user is scheduled to actively use first mobile device 302a). The second user's presence schedule may also specify one or more time periods during which the second user is scheduled to have a presence state of inactive or offline for the first mobile device 302a (e.g., that the second user is schedule to be inactive or not currently use first mobile device 302a).

The time periods may be specified via a start time and an end time and/or some other indication of the beginning and end of a time period. As shown in FIG. 5, the user's first mobile device 302a may specify that on Mondays the second user may be scheduled to have an active or online presence state on first mobile device 302a from 8:00 am to 5:00 pm and an inactive or offline presence state otherwise (e.g., from 12:00 am to 7:59 am and from 5:01 pm and 11:59 pm). In a similar manner, the second user's presence schedule may include a presence schedule specific to the second user's second mobile device 302b as shown in FIG. 5 and may include similar information as the presence schedule for the second user' first mobile device 302a. In one or more arrangements, the presence schedule of the second user's second mobile device 302b may be at least partially the same as the presence schedule of the second user's first mobile device 302a (e.g., same user presence state at the same time). In one or more other arrangements, the presence schedule of the second user's second mobile device 302b may be at least partially different from the presence schedule of second user's first mobile device 302a (e.g., different user presence state at the same time). As an example, the presence schedule for the second user's first mobile device 302a assigns a presence state of inactive or offline for the entire day on Fridays, which is different from presence schedule for the second user's second mobile device 302b that assigns a presence state of active or online from 8:00 am to 5:00 pm on Fridays.

The second user's presence schedule for two mobile devices 302a, 302b are shown out of convenience, it should be understood that the second user's presence schedule may include a presence schedule for other mobile devices of the second user (e.g., mobile device 302c). Further, while the second user's presence schedule is shown for one user, there may be a user's presence schedule for many other users. If messaging management server 303 has not received the presence schedule or an update to the presence schedule, the messaging management server 303 may continue to monitor for when a presence schedule or update to a presence schedule is received from a user or system administrator.

Figure 6:
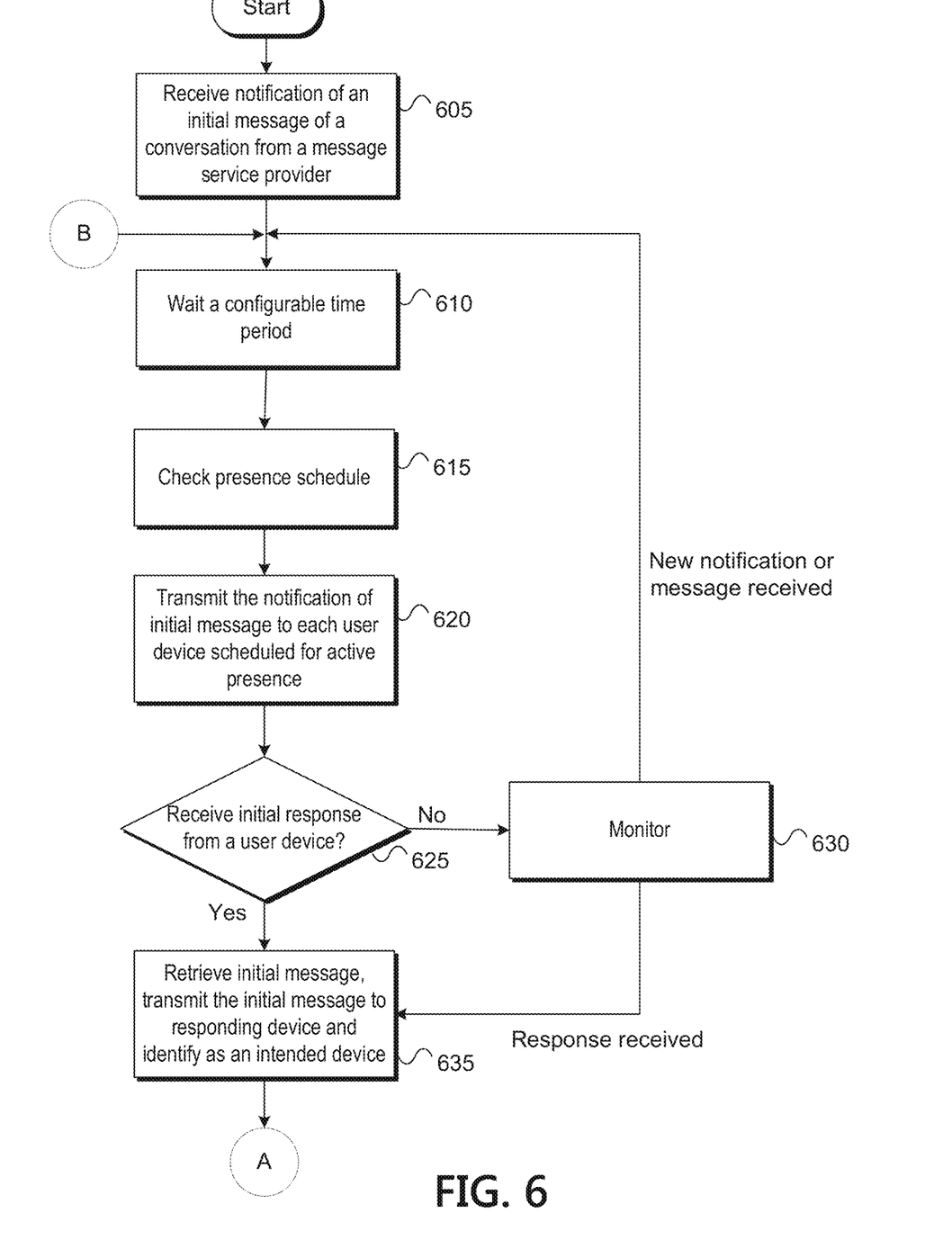
FIGS. 6 and 7 depict an illustrative method to manage messaging that may be used to implement one or more illustrative aspects discussed herein.
Figure 7:
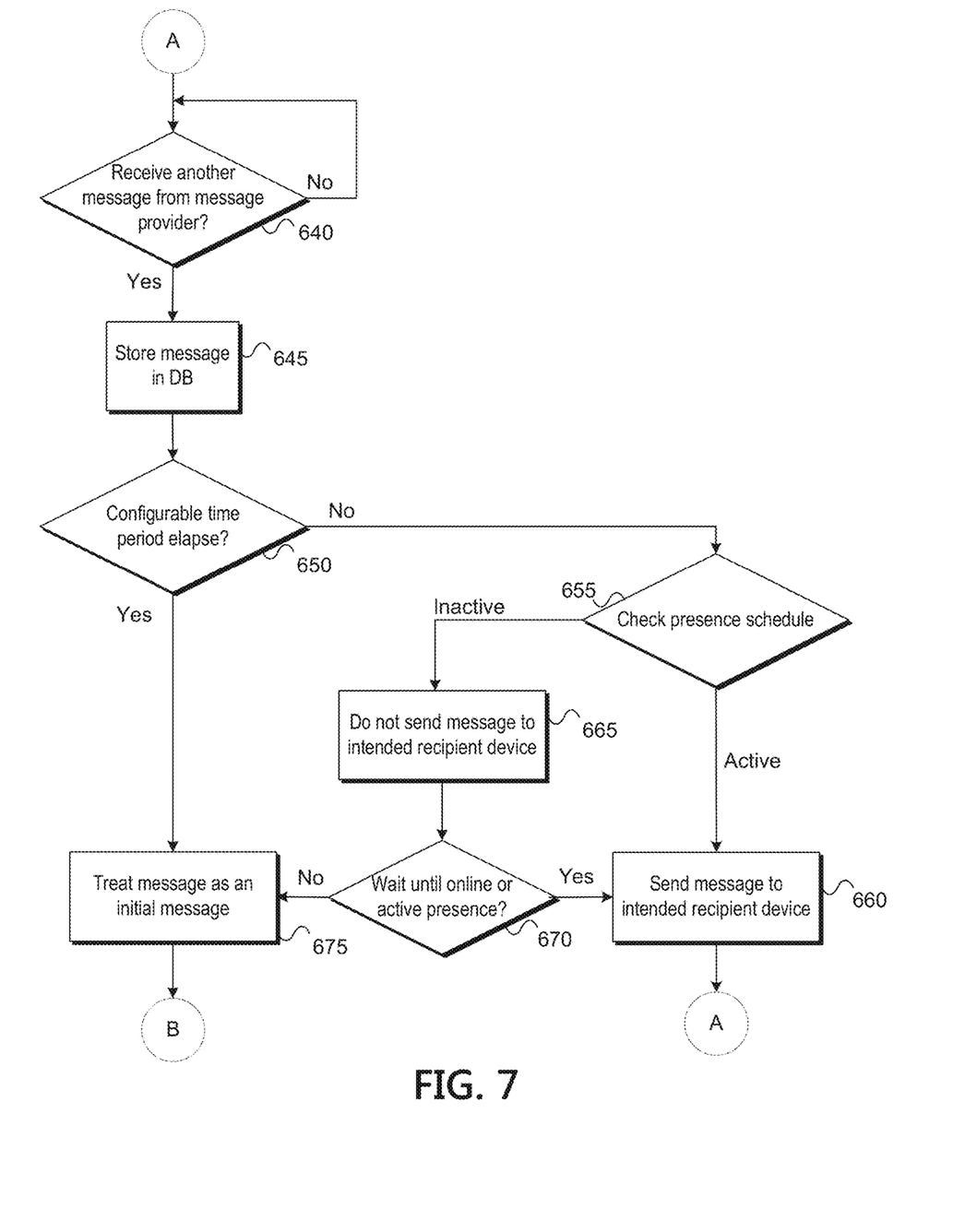

FIGS. 6 and 7 depict an illustrative method to manage messages between users of a messaging service that may be used to implement one or more illustrative aspects discussed herein. In one or more embodiments, the methods of FIGS. 6 and 7 and/or one or more steps thereof may be performed by a computing device (e.g., messaging management server 303). In other embodiments, the method illustrated in FIGS. 6 and 7 and/or one or more steps thereof may be embodied in computer-executable instructions that are stored in a computer-readable medium, such as a non-transitory computer-readable memory. In some instances, one or more of the steps of FIGS. 6 and 7 may be performed in a different order. In some instances, one or more of the steps of FIGS. 6 and 7 may be omitted and/or otherwise not performed.

Prior to performing the steps of FIGS. 6 and 7, a computing device (e.g., the messaging management server 303) may send an indication of an active or online state of a user (e.g., second user) to the messaging service provider 305 so that the messaging service provider 305 may send notifications of messages and/or the messages themselves as discussed above in FIG. 4. Messaging management server 303 may send the indication even if the second user is currently in or schedule to have an inactive or offline presence state for each (e.g., all) of the second user's mobile devices 302a-c. In some embodiments, messaging management server 303 may impersonate one of the second user's mobile devices 303 when sending the indication of the active or online state so that messaging service provider 305 may believe that the indication is being received from the one of the second user's mobile devices 302a-c rather than from messaging management server 303.

As seen in FIG. 6, the method may begin at step 605 in which a computing device (e.g., messaging management server 303) may receive a notification of an initial message of a conversation from message service provider 305. As an example, messaging service provider 305 receives an initial message of a conversation from the first user's computing device 306 that is intended for receipt by a second user. Messaging service provider 305 may send a notification of the initial message to each of the intended recipient's devices that currently indicate that the second user is actively using (e.g., an active or online presence state) the device. As used herein, presence state may be specific to a computing device or an application installed on the computing device. Because messaging management server 303 has sent an indication of an online or active presence state, messaging service provider 305 may send the notification of the initial message to messaging management server 303. Further, if the second user's computing device 301 (e.g., personal computer, laptop computer, etc.) has sent an indication of an online presence state of the second user, messaging service provider 305 may also send the notification of the initial message to the second user's computing device 301. The initial message of a conversation may be the temporal first (e.g., first-in-time) message of a conversation with the first user. Additionally, in some instances, a message may be considered an initial message after a preset period of time has elapsed since receiving the last message from the first user.

In step 610, messaging management server 303 may wait a configurable preset time period after it has received the notification of the initial message in order to give the second user enough time to reply to the notification of the message on his or her computing device 301 (e.g., personal computer, laptop computer, etc.), which may reflect a preference to hold the conversation via the second user's computing device 301 over the second user's mobile devices 302a-c. Messaging management server 510 may wait the configurable period time (e.g., 30 seconds, 3 minutes, etc.) before potentially sending the notification to the second user's mobile devices 302a-c. The second user (e.g., the intended recipient) and/or an administrator may update and/or otherwise change the configurable time period to any desired duration (e.g., 5 minutes, 1 hour, etc.).

In step 615, after the preset time period has elapsed, messaging management server 303 may determine which mobile devices 302a-c the second user is currently scheduled to have an online or active presence state. The notification of the initial message may include an indication and/or other identifier of the intended recipient (e.g., the second user). The messaging management server 303 may retrieve the second user's presence schedule (shown in FIG. 5) from database 304 and determine which of the second user's mobile devices 302a-c the second user is currently scheduled to have an active or online presence state. As an example, messaging management server 303 may determine that the current time is Tuesday, at 4:30 pm and may retrieve the second user's presence schedule shown in FIG. 5 from database 304. As shown in FIG. 5, the second user's presence schedule for his or her first mobile device 302a indicates that the second user is scheduled to have an active or online presence state for his or her first mobile device 302a on Tuesdays from 8:30 am to 4:00 pm and is scheduled to have an inactive or offline presence state otherwise. The second user's presence schedule for his or her second mobile device 302b indicates that the second user is scheduled to have an active or online presence state for his or her second mobile device 302b on Tuesdays from 8:30 am to 5:00 pm and is scheduled to have an inactive or offline presence state otherwise. Based on the second user's presence schedule, messaging management server 303 may determine that the second user's first mobile device 302a is currently scheduled to have an inactive presence state for the second user and that the second user's second mobile device 302b is currently scheduled to have an active presence state for the second user.

In step 620, management server 303 may transmit the notification of the initial message to each (e.g., all) of the second user's mobile devices 302a-c currently scheduled to have an active presence state for the second user in the second user's presence schedule and that are in an on state. Following the above example, messaging management server 303 may send the notification of the initial message to the second user's second mobile device 302b. If there are other mobile devices of the second user (e.g., mobile device 302c) that are also currently scheduled to have an active presence state for the second user, messaging management server 303 may also send the notification to each of those devices.

In some embodiments, messaging management server 303 might not send the notification of the message to the second mobile device 302b if the user's current actual presence state is inactive or offline with respect to the second mobile device 302b since the second user is not using the device. In other embodiments, messaging management server 303 may send the notification to second mobile device 302b even if the user's current actual presence state is inactive but the device is otherwise active (e.g., in an "on" state) and the second user is scheduled to be in active state on that device. An application installed on the second mobile device 302b may, in response to receiving the notification, cause output of a visual, audible, and/or mechanical alert (e.g., light-up, ring, and/or vibrate) to alert the second user of the notification and display the notification to the second user.

Messaging management server 303 might not send the notification to the second user's first mobile device 302a even if the second user is currently using the first mobile device 302a (e.g., the first mobile device 302a actually has an active or online presence state for the second user) since the presence schedule is controlling and the second user is currently scheduled to have an inactive or offline presence state for device 302a. Further, messaging management server 303 might not send the notification to other mobile devices (e.g., mobile device 302c) if the user is currently scheduled to have an inactive or offline presence state with respect to those devices. As a result, an operator or the second user may schedule the times during which each of mobile devices 302a-c may receive notifications and messages. Thus, the second user may receive notifications and/or messages on his or her first mobile device 302a during the work day but might not receive inconvenient message notifications after she has left work for the day even if he or she still continues to use the device after work.

In step 625, messaging management server 303 may determine whether it has received an initial response from one of the mobile devices 302 to which it sent the notification of the initial message. As an example, the second user's second mobile device 302b may, in response to receiving the notification, display the notification to the second user, and the second user may input into the second mobile device 302b a response to retrieve the initial message, which may then be transmitted to messaging management server 303.

If an initial response has not been received, messaging management server 303 may, in step 630, continue to monitor whether an initial response has been received until the initial response is received from a responding mobile device (e.g., mobile device 302b), or another notification and/or message is received from messaging service provider 305 that is associated with the same sender (e.g., the first user). If a response to the initial notification is received from e.g., mobile device 302b, process may continue to step 635. If a new notification is received from messaging service provider 305, steps 610-625 may be repeated for the new notification.

In one or more instances, the second user may respond to the notification of the initial messages and/or the initial message via his or her computing device 301. As a result, messaging service provider 305 may link messages of the conversation to computing device 301. For example, messaging service provider 305 may route and/or relay messages of the conversation between the first user's computing device 306 and the second user's computing device 301 without sending a communication (e.g., any communication relating to the conversation) to messaging management server 303 since messaging service provider 305 has determined that the second user is responding to the conversation on computing device 301. However, if the second user stops responding on computing device 301 for a configurable minimum preset time period, messaging service provider 305 may send a new notification of the next message from the first user to messaging management server 303 which may then perform steps 610-625.

In step 635, if an initial (e.g., first-in-time) response is received from one of the mobile devices 302a-c to which the notification was sent, messaging management server 303 may retrieve the initial message from messaging service provider 305 if it has not already done so, transmit the initial message to the responding mobile device for output (e.g., display) to the second user, and identify the responding mobile device as the second user's intended device for responding to messages in a conversation with the first user. Messaging management server may store an indication that this device is the intended device in database 304, which may include a media access control (MAC) address or other identifier of the device. From this point forward, the second user's intended mobile device (e.g., mobile device 302b) may transmit messages to the first user's computing device 306 until the preset configurable time period discussed in step 650 below has elapsed. The messages sent from the second user's mobile device 302b may be routed through messaging management server 303 and messaging service provider 305 to device 306, and may be created from user input at mobile device 302b.

If messaging management server 303 subsequently receives a second response from another mobile device to which the notification was sent, messaging management server 303 may respond with a message indicating that another device has already been identified as the intended device for responding to the conversation with the first user. Further, messaging management server 303 might not send the initial message to that responding mobile device. In some embodiments, once a notification or message is sent to a device, messaging management server 303 may delete the notification or message from database 304.

In step 640, messaging management server 303 may receive another message of the conversation from messaging service provider 305 that originated from the first user's computing device 306 and is intended for receipt by the second user. In some embodiments, messaging management server 303 may periodically request messaging service provider 305 to provide messaging management server 303 with any messages from the first user and intended for the second user. If a message is not received from messaging service provider 305, messaging management server 303 may continue to monitor for messages received from messaging service provider 305. If a message is received from the messaging service provider 305 that originated from the first user and is intended for the second user, messaging management server 303 may, in step 645, store the message in database 304.

In step 650, messaging management server 303 may determine whether a configurable maximum time period has elapsed since messaging management server 303 has received a communication (e.g., a message, response, etc.) from the mobile device identified as the intended device for responding to messages from the first user in this conversation, which was identified in step 635 discussed above. Messaging management server 303 may track the time when messages are received from the intended devices. As an example, messaging management server 303 may, upon on receipt of a message from the intended device (e.g., mobile device 302b), generate a timestamp of when the message was received and store the timestamp in timestamp log in database 304. The timestamp may include the date include month, day, and year. The timestamp may also include the time of day including hour, minutes, and seconds.

Messaging management server 303 may generate a timestamp of when the message was received from messaging service provider 305 and compare that timestamp with the latest timestamp associated with a communication received from the intended device (e.g., mobile device 302b). If the resulting duration is less than or equal to a configurable maximum time period (e.g., the configurable time period has not elapsed), the process may continue to step 655. Otherwise, if the resulting duration is greater than the configurable maximum time period (e.g., the configurable time period has elapsed), the process may continue to step 675. The configurable time period may be 5 minutes, 30 minutes, 1 hour, or some other duration of time. The time period may be set, adjusted, and/or otherwise configured by an operator of messaging management server 303.

As an example, the maximum time period may be 30 minutes. If the messaging management server 303 received the message from messaging service provider 305 at timestamp Jul. 7, 2015, at 10:45 am and received the latest (e.g., most recent) communication from the mobile device 302b at timestamp Jul. 7, 2015, at 10:00 am, then the messaging management server 303 may determine that the resulting duration is 45 minutes. Messaging management server 303 may also determine that the maximum time period has elapsed since the 45 minutes is greater than the maximum time period of 30 minutes and may proceed to step 675 where messaging management server 303 may treat the message received from messaging service provider 305 as an initial message and send a notification of the message to the second user's mobile devices 302a-c as will be discussed in further detail below. This permits messaging management server 303 to send a notification to the second user's mobile devices 302a-c in the event the second user stops responding on the intended device for at least the maximum time period.

In another instance, messaging management server 303 may determine that it received the latest communication from mobile device 302b at timestamp Jul. 7, 2015, at 10:30 am (rather than at Jul. 7, 2015, at 10:00 am as discussed above). In such an instance, messaging management server 303 may determine that the resulting duration is 15 minutes and determine that the maximum time period has not elapsed since 15 minutes is less than the maximum time period of 30 minutes and may proceed to step 655.

In step 655, in response to receiving a message from messaging service provider 305 that originated with the first user and is intended for the second user and determining that the time period has not elapsed, messaging management server 303 may determine whether the second user is currently scheduled to have an active presence on the intended device (e.g., mobile device 302b) in a similar manner to that discussed above in step 615 by consulting the second user's presence schedule for mobile device 302b. If the second user is currently scheduled to be in active or online presence state with respect to mobile device 302b, then messaging management server 303 may, in step 660, send the message to mobile device 302b and delete the message from database 304. The message might not be sent to other mobile devices of the second user (e.g., mobile device 302a) since it is not the intended device. Messaging management server 303 may proceed to step 640 to determine whether another message has been received from messaging service provider 305. Additionally, messaging management server 303 may continue to relay messages originated from mobile device 302b to messaging service provider 305 so that the messages may be received by the first user.

In some embodiments, if the intended device (e.g., mobile device 302b) is currently offline or in an off state (e.g., turned off), messaging management server 303 may wait until either mobile device 302b is in an on state (e.g., turned on) and send the message to the mobile device 302b at that time, or may proceed to step 675 and treat the message as an initial message.

In step 665, if the second user is currently schedule to be inactive on mobile device 302b (e.g., scheduled to be in an offline or inactive presence state with respect to mobile device 302b), messaging management server 303 might not send the message to mobile device 302b even if the second user is actively using mobile device 302b (e.g., the second user's actual presence state is active at mobile device 302b). In step 670, messaging management server 303 may determine whether to wait until the second user is scheduled to be active on mobile device 302b according the second user's presence schedule. The determination may be based on one or more rules stored in database 304. As an example, a rule may be based on how much time will pass until the second user is scheduled to be active on mobile device 302b. If that amount of time is greater than a maximum time period (e.g., 30 minutes, 1 hour, or some other duration of time), the rule may specify that the process should continue to step 675 and treat the message as an initial message. Otherwise, if the amount of time is less than or equal to the maximum time period, the rule may specify that messaging management server 303 should wait until the second user is scheduled to be active on mobile device 302b and, in step 660, transmit the message to mobile device 302b at that time. In some embodiments, the rule may be based on an urgency level. For example, the first user may specify a high urgency level (rather than a low or standard urgency level). As a result, messaging management server 303 may proceed to step 675 so that the second user receives the message in short order (e.g., as quickly as possible).

In one example, the maximum preset threshold may be 3 hours. If the message (originating from the first user and intended for the second user) was received from the messaging service provider 305 at timestamp May 1, 2015, at time 6:00 pm and the second user is not scheduled to be active on mobile device 302b until May 2, 2015 at time 8:00 am, messaging management server 303 may determine that the duration until the second user is scheduled to be active on mobile device 302b (e.g., 14 hours) is greater than the 3-hour maximum time period and, thus, may proceed to step 675 to treat the message as an initial message. In another example, if the maximum time period was 24 hours rather than 3 hours, messaging management server 303 may determine that duration until the second user is schedule to be active on mobile device 302b (e.g., 14 hours) is less than 24-hour maximum time period. As a result, messaging management server 303 may wait until the second user is scheduled to be active on mobile device 302b and, in step 660, send the message to mobile device 302b at that time.

In step 675, messaging management server 303 may treat the message (originating from the first user and intended for the second user) received from the messaging service provider 305 as an initial message and may proceed to step 610. By treating the message as an initial message, messaging management server 303 may transmit a notification of the message to each mobile device 302a-c on which the second user is currently scheduled to be active in step 620 so that the second user may be notified of the message from the first user.

Additionally or alternatively, in one or more embodiments, messaging management server 303 may receive a request or inquiry for a message from one or more mobile device 302a-c. In such embodiments, if messaging management server 303 currently has stored a message relating to the request or inquiry in database 304, messaging management server 303 may determine whether the requesting device is the intended device, for example, by comparing an identifier (e.g., a MAC address) of the requesting device with the identifier (e.g., MAC address) of the intended device stored in database 304. If identifiers match, messaging management server 303 may send the message stored in database 304 to the requesting device. In some embodiments, messaging management server 303 may wait and send the message once the user of the requesting device is currently schedule to be active on that device based on the user's presence schedule and that device is actually online. If the identifiers do not match, messaging management server 303 may send, to the requesting device, an indication that the requesting device is not the intended to device and might not send the message.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. An apparatus comprising:
one or more processors; and
memory storing instructions that, when executed by the one or more processors, cause the apparatus to:
send an indication of a state of a second user to an instant messaging service provider on behalf of the second user in response to a state of the second user being inactive or offline;
receive an indication from the instant messaging service provider that a message has been received by the instant messaging service provider, wherein the message is sent from a first user and intended for receipt by the second user, the message being undeliverable to a client device of the second user while the state of the second user is inactive or offline;
delay retrieval of the message from the instant messaging service provider for a configurable preset duration;
after the configurable preset duration has elapsed, retrieve the message from the instant messaging service provider and store the message in a database in response to the client device being unable to accept delivery of the message on behalf of the second user;
send a notification to a first set of user devices associated with the second user, the notification indicating an availability of the retrieved message; and
receive an initial response to the notification from a responding user device of the first set of user devices;
after receiving the initial response, retrieve the message from the database; and
send the message to the responding user device.

2. The apparatus of claim 1, wherein the instructions, when executed by the one or more processors, cause the apparatus to send the notification to a particular user device of the first set of user devices even if the second user has an inactive presence state on the particular user device.

3. The apparatus of claim 1, wherein the instructions, when executed by the one or more processors, further cause the apparatus to:
receive a second message originating from the first user and intended for receipt by the second user;
determine a first time, wherein the first time is a time at which a latest communication was received from the responding user device prior to receiving the second message;

determine a second time, wherein the second time is a time at which the second message was received;

determine a duration based on the first time and the second time;

determine whether the duration is greater than a maximum duration; and in response to determining that the duration is greater than the maximum duration, send a second notification indicating availability of the second message to a second set of user devices associated with the second user on which the second user is currently scheduled to be in an active state based on a presence schedule of the second user.

4. The apparatus of claim 3, wherein the instructions, when executed by the one or more processors, further cause the apparatus to:

in response to determining that the duration is less than or equal to the maximum duration, send the second message to the responding user device.

5. The apparatus of claim 4, wherein the instructions, when executed by the one or more processors, further cause the apparatus to:

determine whether the second user is scheduled to be active on the responding user device at the second time based on the presence schedule of the second user; and in response to determining that the second user is scheduled to be active on the responding user device at the second time, permit the apparatus to send the second notification indicating availability of the second message to the responding user device.

6. The apparatus of claim 3, wherein the instructions, when executed by the one or more processors, further cause the apparatus to:

receive an update to the presence schedule; and
update the presence schedule based on the update.

7. The apparatus of claim 1, wherein the instructions, when executed by the one or more processors, further cause the apparatus to:

receive an inquiry from an inquiring user device associated with the second user; and in response to determining that the inquiring user device is not the responding user device, prevent sending of the message received on behalf of the second user to the inquiring user device.

8. A method comprising:

sending, by a computing device, an indication of a state of a second user to an instant messaging service provider on behalf of the second user in response to a state of the second user is being inactive or offline;

receiving, by the computing device and from the instant messaging service provider, an indication that a message has been received at the instant messaging service provider, wherein the message is sent from a first user and intended for receipt by the second user, the message being undeliverable to a client device of the second user while the state of the second user is inactive or offline;

delaying, by the computing device, retrieval of the message from the instant messaging service provider for a configurable preset duration;

after the configurable preset duration has elapsed, retrieving, by the computing device, the message from the instant messaging service provider and storing, by the computing device, the message in a database in response to the client device being unable to accept delivery of the message on behalf of the second user;

sending, by the computing device, a notification to a first set of user devices associated with the second user, the notification indicating an availability of the retrieved message; and receiving, by the computing device and from a responding user device of the first set of user devices, an initial response to the notification;

after receiving the initial response, retrieving, by the computing device and from the database, the message; and sending, by the computing device and to the responding user device, the message.

9. The method of claim 8, wherein the sending of the notification to a particular user device of the first set of user devices occurs even if the second user currently has an inactive presence state on the particular user device.

10. The method of claim 8, further comprising:

receiving, by the computing device, a second message originating from the first user and intended for receipt by the second user;

determining, by the computing device, a first time, wherein the first time is a time at which a latest communication was received from the responding user device prior to receiving the second message;

determining, by the computing device, a second time, wherein the second time is a time at which the second message was received;

determining, by the computing device, a duration based on the first time and the second time;

determining, by the computing device, whether the duration is greater than a maximum duration; and in response to determining that the duration is greater than the maximum duration, sending, by the computing device, a second notification indicating availability of the second message to a second set of user devices associated with the second user on which the second user is currently scheduled to be in an active state based on a presence schedule of the second user.

11. The method of claim 10, further comprising:

determining, by the computing device, whether the second user is scheduled to be active on the responding user device at the second time based on the presence schedule of the second user; and in response to determining that the second user is scheduled to be active on the responding user device at the second time, sending, by the computing device and to the responding user device, the second notification indicating availability of the second message.

12. One or more non-transitory computer-readable media storing instructions that, when executed by one or more processors of an apparatus, cause the apparatus to:

send an indication of a state of a second user to an instant messaging service provider on behalf of the second user in response to a state of the second user being inactive or offline;

receive an indication from the instant messaging service provider that a message has been received by the instant messaging service provider, wherein the message is sent from a first user and intended for receipt by the second user, the message being undeliverable to a client device of the second user while the state of the second user is inactive or offline;

delay retrieval of the message from the instant messaging service provider for a configurable preset duration;

after the configurable preset duration has elapsed, retrieve the message from the instant messaging service provider and store the message in a database in response to the client device being unable to accept delivery of the message on behalf of the second user; and send a notification to a first set of user devices associated with the second user, the notification indicating an availability of the retrieved message; and receive an initial response to the notification from a responding user device of the first set of user devices;

after receiving the initial response, retrieve the message from the database; and send the message to the responding user device.

13. The one or more non-transitory computer-readable media of claim 12, storing additional instructions that, when executed by the one or more processors of the apparatus, cause the apparatus to send the notification to a particular user device of the first set of user devices even if the second user has an inactive presence state on the particular user device.

14. The one or more non-transitory computer-readable media of claim 12, storing additional instructions that, when executed by the one or more processors of the apparatus, cause the apparatus to:

receive a second message originating from the first user and intended for receipt by the second user;

determine a first time, wherein the first time is a time at which a latest communication was received from the responding user device prior to receiving the second message;

determine a second time, wherein the second time is a time at which the second message was received;

determine a duration based on the first time and the second time;

determine whether the duration is greater than a maximum duration; and in response to determining that the duration is greater than the maximum duration, send a second notification indicating availability of the second message to a second set of user devices associated with the second user on which the second user is currently scheduled to be in an active state based on a presence schedule of the second user.

15. The one or more non-transitory computer-readable media of claim 14, storing additional instructions that, when executed by the one or more processors of the apparatus, cause the apparatus to:

in response to determining that the duration is less than or equal to the maximum duration, send the second message to the responding user device.

16. The one or more non-transitory computer-readable media of claim 15, storing additional instructions that, when executed by the one or more processors of the apparatus, cause the apparatus to:

determine whether the second user is scheduled to be active on the responding user device at the second time based on the presence schedule of the second user; and in response to determining that the second user is scheduled to be active on the responding user device at the second time, permit the apparatus to send the second notification indicating availability of the second message to the responding user device.

* * * * *